Nov. 17, 1970   A. R. BURCH ET AL   3,541,415

PULSE MODULATING CONTROL ARRANGEMENT

Filed Feb. 19, 1968   3 Sheets-Sheet 1

INVENTORS
ARTHUR R. BURCH
WILLIAM B. WALTON
HOWARD C. HANSEN
RICHARD W. KREUTTER

BY

ATTORNEYS

Nov. 17, 1970  A. R. BURCH ET AL  3,541,415
PULSE MODULATING CONTROL ARRANGEMENT
Filed Feb. 19, 1968
3 Sheets-Sheet 2
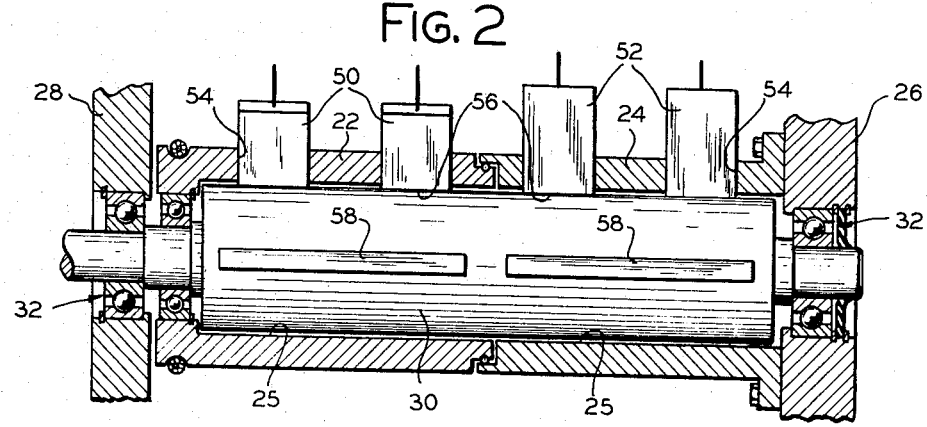
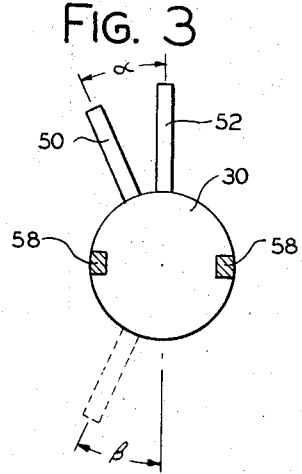
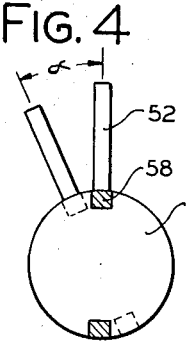
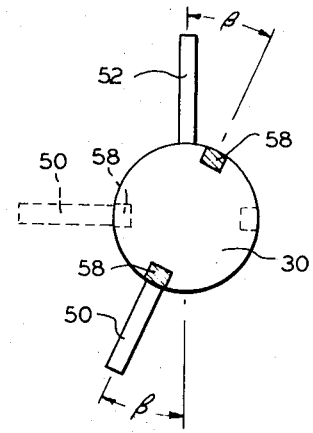
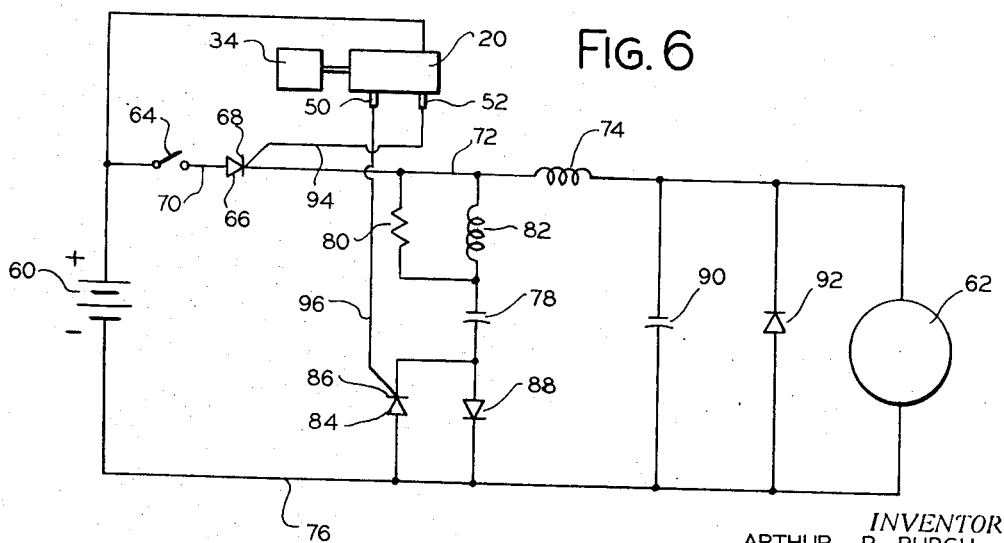
INVENTORS
ARTHUR R. BURCH
WILLIAM B. WALTON
HOWARD C. HANSEN
RICHARD W. KREUTTER
BY
ATTORNEYS

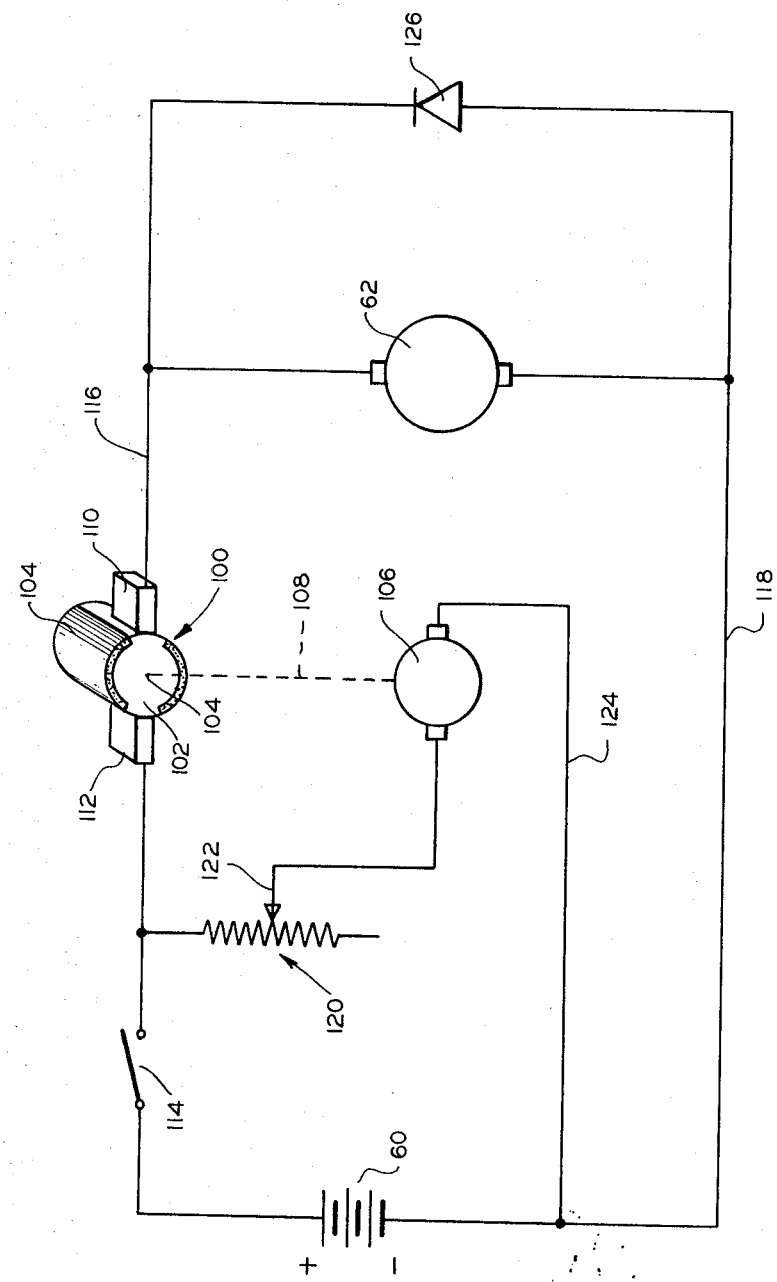

United States Patent Office 3,541,415
Patented Nov. 17, 1970

3,541,415
PULSE MODULATING CONTROL ARRANGEMENT
Arthur R. Burch, William B. Walton, Howard C. Hansen, and Richard W. Kreutter, Battle Creek, Mich., assignors to Clark Equipment Company, a corporation of Michigan
Filed Feb. 19, 1968, Ser. No. 706,428
Int. Cl. H02r 7/22
U.S. Cl. 318—330                    12 Claims

ABSTRACT OF THE DISCLOSURE

A pulse control arrangement for modulating the frequency and duration of electrical input pulses from a direct current voltage source to an electrically actuated device, such as an electric motor. The control arrangement includes a circuit having driven rotary switch with relatively movable sets of contact members adjustable to selectively establish output pulse signals which energize the gates of silicon controlled rectifiers in a manner to open or close a circuit electrically connecting the voltage source to the electric motor.

BACKGROUND OF THE INVENTION

It is a general practice in the material handling field to utilize material handling devices such as hand trucks to convey materials to and from storage areas or between loading platforms and other areas. Such material handling vehicles generally have self-contained drive systems which allow the operators to actuate control levers and thereafter steer the vehicles to desired locations. It has been found that direct current electric motors provide a suitable power source for material handling devices such as hand trucks and provide a clean and efficient source of energy. The use of direct current electric drive motors has heretofore generally required a separate means for controlling the speed of the vehicle, such as a gear reduction unit disposed between the drive motor and the driven wheels. The need for such separate speed controls greatly increases the weight of the vehicle and reduces its overall efficiency. Similar problems arise in the use of electric motors to effect movement of other devices, such as electric automobiles, golf carts and the like which require reductions in the output speeds of the drive motors in coupling them to the associated devices.

SUMMARY OF THE INVENTION

It is one of the primary objects of the present invention to provide a novel pulse control arrangement for controlling the frequency and duration of input pulse signals from a voltage source to an electric motor in a manner to control the torque and rotational speed of the motor and thereby eliminate the need for a speed change device between the motor and an apparatus operatively associated in driven relation with the electric motor.

Another object of the present invention is to provide a pulse control arrangement for controlling the frequency and duration of input pulse signals from a voltage source to an electric motor, which pulse control arrangement utilizes a manually adjustable electrically driven rotary switch to mechanically modulate the frequency and duration of input signals from the voltage source to the electric motor.

Another object of the present invention is to provide a pulse control arrangement as described wherein the rotary switch is manually adjustable and includes two sets of contact members, one set of which is movable relative to the other to change the conductive phase relationship between the respective sets of contact members.

A further object of the present invention is to provide a pulse control arrangement as described including a novel control circuit employing a pair of silicon controlled rectifiers, the gate of one of the rectifiers being adapted to receive the output signals from one set of contact members of the rotary switch to thereby close the circuit between the voltage source and the electric motor, and the gate of the other rectifier being adapted to receive the output signals from the other set of contact members to effect turn-off of the first silicon controlled rectifier and thereby open the control circuit to the electric motor.

Another object of the present invention is to provide a pulse control arrangement utilizing an electrically driven rotary switch as described and employing a rheostat controlled electric drive motor for the switch such that the frequency of modulation can be controlled through the rheostat.

Another object of the present invention is to provide a pulse control arrangement as described which finds particular application in controlling the input signal pulses from a voltage source to a direct current electric motor used to drive a material handling apparatus.

Another object of the present invention is to provide a pulse control arrangement as described which is extremely efficient in operation and lends itself to a very compact control system for a direct current electric motor.

In a preferred embodiment of a pulse control arrangement in accordance with the present invention, a rotary switch device including a rotatable cylinder having circumferentially spaced longitudinally extending conductive elements or segments thereon is adapted to be rotatably driven by a fractional horsepower motor. The rotary switch is provided with two sets of contact members, each set comprising two contact members adapted to engage the peripheral surface of the rotatable cylinder in a manner such that the two contact members of each set will be conductively coupled by the conductive elements during rotation of the rotatable cylinder. The two sets of contact members are supported such that one set is angularly movable relative to the other set thereby allowing the conductive phase relationship between the respective sets of contact elements to be varied. The contact members are adapted to establish an output signal when they are conductively coupled through a conductive element. A control circuit is provided to selectively conductively couple a voltage source to a direct current electric motor or other electric load and includes first and second silicon controlled rectifiers, the gates of which are adapted to receive output pulse signals from the respective sets of contact members of the rotary switch. The gate of the first silicon controlled rectifier receives a pulse signal from one set of contact members and closes the circuit between the voltage source and the electric motor for actuation thereof. The gate of the second silicon controlled rectifier receives a pulse signal from the other set of contact members at a later time as determined by the angular relation of the sets of contact members and serves to turn off the first silicon controlled rectifier to thereby open the circuit to the electric motor with a resulting deenergization of the motor. The present invention provides an efficient control means for controlling the frequency and duration of input signals to the electric motor to thereby control its actuation.

Further objects and advantages of our invention, together with the organization and manner of operation thereof, may best be understood by reference to the following description taken in conjunction with the accompanying drawings, in which like reference numerals designate like parts throughout the several views.

BRIEF DESCRIPTION OF THE DRAWINGS

FIG. 2 is a median view, partly in section, of the rotary switch illustrated in FIG. 1;

FIG. 3 is a schematic end view of the rotatable cylinder and contact members illustrated in FIG. 2;

FIG. 4 is a schematic end view similar to FIG. 3 illustrating the relative angular positions of the sets of contact members to provide a minimum pulse duration;

FIG. 5 is a schematic end view similar to FIG. 4 but illustrating the relative positions of the sets of contact members to provide a maximum pulse duration, with the movable set of brush contacts being illustrated in dash lines at an intermediate position;

FIG. 6 is a diagrammatic view showing the control circuit for controlling the input pulse signal from a voltage source to the direct current electric motor; and FIG. 7 illustrates an alternative control circuit for use with the rotary switch of FIGS. 1–5, which circuit includes a rheostat controlled switch driving motor to selectively vary the frequency of electrical impulse signals to a main drive motor.

DESCRIPTION OF THE PREFERRED EMBODIMENTS

Figure 1:
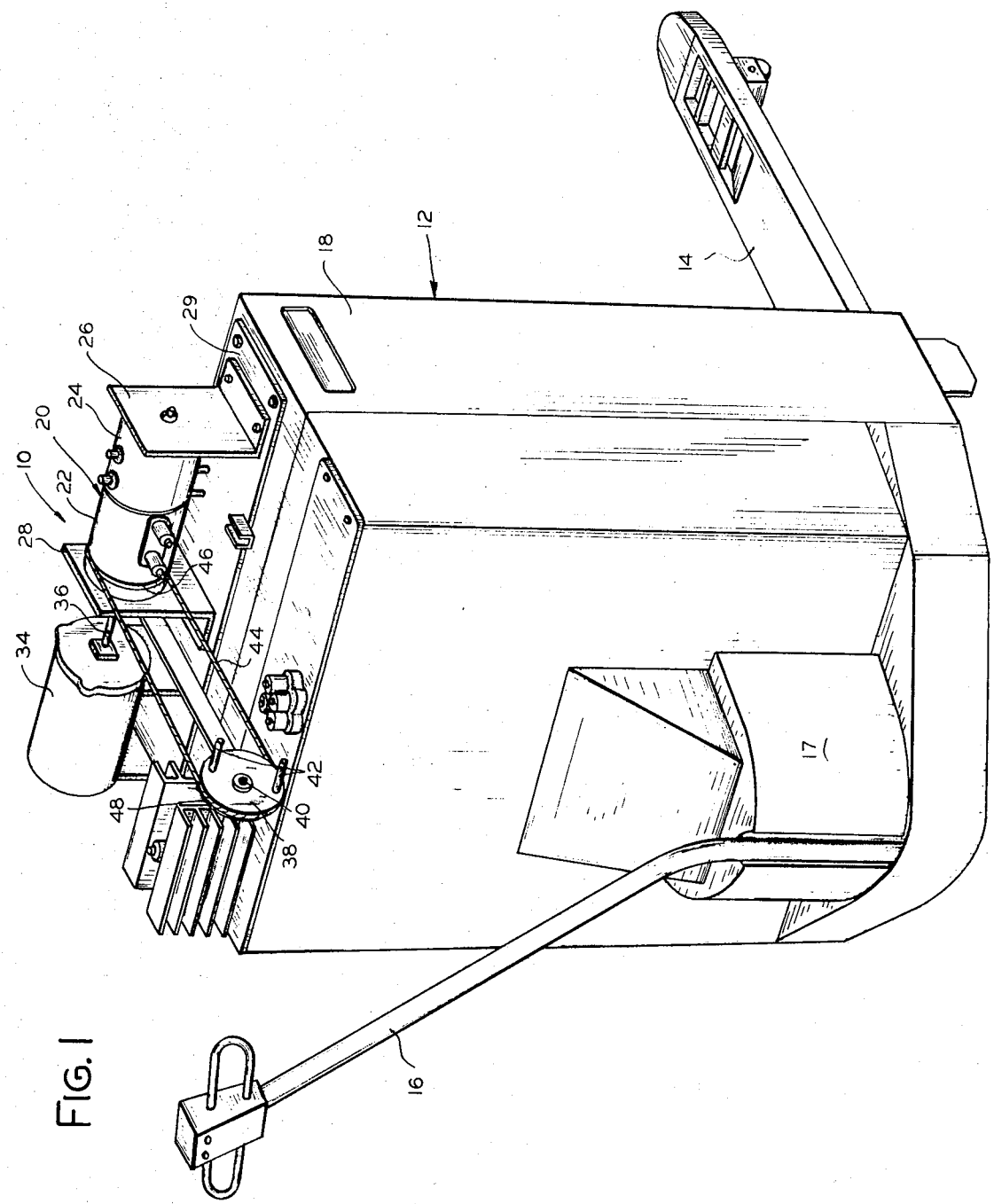
FIG. 1 is a perspective view of a material handling hand truck utilizing a control arrangement in accordance with the present invention.

Referring now to the drawings, FIG. 1 illustrates a pulse control arrangement, shown generally at reference numeral 10 in accordance with the present invention operatively associated with a material handling hand truck, shown generally at reference numeral 12. The hand truck 12 includes a pair of forwardly extending support arms, one of which is shown at 14, which serve to support a load or load carrying pallet during transportation thereof. A steering shaft 16 is disposed on the rearward portion of the hand truck such that the operator may steer the truck through a single drive wheel (not shown) within the housing portion 17 in a conventional manner. A generally upstanding casing or housing 18 on the hand truck serves to enclose a power supply such as a bank of batteries or other direct current voltage source for a direct current electric drive motor (not shown) utilized as the main primary power source to drive the single drive wheel of the hand truck. The main electric drive motor may comprise a suitable conventional series or shunt wound DC motor. In accordance with the present invention, the pulse control arrangement 10 serves to control the frequency and duration of input signals from the direct current voltage source to the direct current electric motor and thereby serves to control the rotational speed of the motor with a resultant control of the movement of the hand truck. While the pulse control arrangement 10 of the present invention is illustrated as operatively associated with the hand truck 12, it will be understood that the pulse control arrangement will find ready application with other electrically actuated devices.

The pulse control arrangement 10 includes a switch means, shown generally at 20, of the rotary commutator type wherein electric circuit is made through sliding contact members. The rotary switch means 20 includes generally cylindrical housing portions 22 and 24 disposed in adjacent axial alignment and rotatably movable relative to each other. The housing portions 22 and 24 are supported between a pair of upstanding plate members 26 and 28 which are suitably mounted on the upper surface of the casing 18 through a support plate 29. The switch housing portion 24 is suitably fixedly secured to the upstanding plate member 26 while the switch housing portion 22 is supported on the upstanding plate member 28 in a suitable manner to allow rotational movement thereof. Housing portion 22 is preferably coupled to the fixed housing portion 24 in a manner to allow relative rotational movement therebetween while preventing dust and other foreign matter from entering the interior portions of the housing.

Referring now to FIG. 2, taken in conjunction with FIG. 1, each of the switch housing portions 22 and 24 is provided with an identical cylindrical axial bore 25 which, when the housing portions are in adjacent axial assembled relation, extends throughout the combined lengths of the switch housing portions. The axial bore 25 is adapted to receive a cylindrical member 30 which is rotatably supported by the upstanding plate members 26 and 28 through bearing assemblies 32. The cylinder member 30 is coupled to a fractional horsepower direct current electric motor 34 so as to be rotatably driven thereby. The electric motor 34 is suitably supported on the base plate 29 such that the driven shaft 36 thereof may be directly coupled to the cylindrical member 30. If desired, a speed change means or speed reducer may be provided between the electric motor drive shaft 36 and the driven cylinder 30 to allow selection of the desired rotational speed of cylinder 30 during operation without having to change or adjust the motor 34.

As indicated above, the switch housing member 22 is rotatably movable relative to the fixed housing portion 24. Means to effect such relative rotational movement of the housing portion 22 are provided in a position to be readily accessible to the operator and include an actuator member 38 rotatably mounted on a support pin 40 on the forward portion of the casing or housing 18 of the hand truck. A pair of horizontally projecting rods 42 on the actuator 38 allow the operator to rotate the actuator as desired. An endless belt or chain member 44 is suitably coupled between the movable housing portion 22 and the rotatable actuator member 38 as by frictionally engaging an annular groove 46 in the peripheral surface of the housing portion 22 and an annular groove 48 provided in the peripheral surface of the circular actuator member 38. It will be understood that other suitable means for effecting rotation of the housing member 22 will be readily apparent to one skilled in the art, such as for example, a gearing arrangement suitably coupled to an annular gear member on the housing portion 22.

Each of the switch housing portions 22 and 24 has a set of carbon graphite brush contact members 50 and 52, respectively, suitably secured within apertures 54 so as to engage the peripheral surface of the cylindrical member 30 in generally normal relation. Each of the contact members 50 and 52 may be of a conventional brush contact design with the inner contacting edge surface 56 thereof having a concave cross section of a radius equal to the radius of the cylindrical member 30. The two contact members comprising each of the respective sets of contacts 50 and 52 are in longitudinal alignment with each other such that a longitudinally extending element in the peripheral surface of the cylinder member 30 will engage the two contact members simultaneously.

The cylindrical member 30 has four conducting elements 58 fixedly secured in the peripheral surface thereof so as to comprise two axially spaced sets of diametrically opposed conductive elements. One set of conductive elements 58 is disposed so as to conductively couple or connect the contact members 50 during rotation of the cylindrical member 30, while the other set of conductive elements is disposed so as to conductively connect the contact members 52. The circumferential widths of the conductive elements 58 are substantially the same as the widths of the brush contact members 50 and 52 when considered across the peripheral engaging surfaces 56 thereof. The cylindrical member 30 is made of a nonconductive material having wear characteristics similar to the conductive material of the conductive elements 58 so as to preclude the formation of wear ridges at the interfaces of the conductive elements and the cylindrical member 30 during sliding contact with the brush contact members 50 and 52. Having described the cylindrical member 30 as having two diametrically opposed conductive elements 58 associated with each set of contact members 50 and 52, it will be understood that the respective sets of contact members 50 and 52 will be conductively connected twice per revolution of the cylindrical member 30 with the period and frequency of conduction being dependent on the relative rotational speed of cylinder 30, the circumferential widths of the contact surfaces 56 of the brush contact members 58 and the circumferential widths of the conductive elements 58. Each of the brush contact members 50 and 52 has a suitable conductor lead secured to the outer end thereof for purposes of coupling the respective sets of contact members to an electrical circuit such that when the conductive elements 58 conductively connect the respective sets of contact members 50 and 52 during rotation of member 30, a low power output signal will be established, as will be more fully described hereinbelow.

FIG. 6 illustrates one embodiment of a circuit means adapted to selectively couple a direct current voltage source 60, which may take the form of the above described bank of batteries within the hand truck housing or casing 18, to a direct current electric drive motor 62 which serves as the above noted primary power source to drive the hand truck through the drive wheel disposed within the housing portion 17 of the hand truck. The circuit includes a hand switch 64 which is disposed on the hand truck 12 in a position to be readily accessible to the operator, such as on the outer end portion of the steering shaft 16. The hand switch 64 serves as a manual on-off switch for the primary control circuit. The anode of a first silicon controlled rectifier 66, having a gate 68, is connected to the voltage source 60 through a conductor 70 and the hand switch 64. The cathode of the first silicon controlled rectifier 66 is connected to the direct current electric motor 62 through a conductor 72 and an inductance 74 with the circuit being completed to the ground side of the voltage source 60 through a conductor 76. Coupled between the conductors 72 and 76 in parallel with the drive motor 62 is a circuit including a capacitor 78, one plate of which is coupled to the conductor 72 through a resistor 80 in parallel with an inductance 82. The other plate of the capacitor 78 is connected to the cathode of a second silicon controlled rectifier 84, having a gate 86, and to the anode of a diode 88. A filter capacitor 90 and a protective diode 92 are connected across the drive motor 62.

The gate 68 of the first silicon controlled rectifier 66 is connected through a conductor 94 to the fixed contact members 52 of the rotary switch 20 such that the gate will receive a low power signal when the contact members 52 are conductively connected by a conductive element 58 during rotary movement of the cylindrical member 30 of the rotary switch. The gate 86 of the second silicon controlled rectifier 84 is connected to the movable contact members 50 of the switch means 20 through a conductor 96 in a manner to receive a low power signal when the corresponding fixed contact members 50 are conductively connected through a corresponding conductive element 58.

Referring now to FIGS. 2–6, the operation of the pulse control arrangement above described is as follows: prior to movement of the hand truck 12, the operator will close the manual switch 64, and energize the direct current switch drive motor 34 to effect rotational movement of the cylindrical member 30 of the rotary switch 20. Assuming the relative positions of the fixed and movable contact members 52 and 50, respectively, of the rotary switch 20 to be in the positions shown schematically in FIG. 3, it can be seen that as one of the conductive elements 58 in the peripheral surface of the cylindrical member 30 is rotated into a position so as to conductively connect the fixed contact members 52 (FIG. 4), a lower power output signal from the voltage source 60 will be established through the conductor 94 and applied to the gate 68 of the first silicon controlled rectifier 66. At this point, the first silicon controlled rectifier will be turned on to close the control circuit between the voltage supply 60 and the drive motor 62 to thereby effect rotational movement of the drive motor 62 with a resultant motion in the drive wheel of the hand truck.

At a finite time period after the first silicon controlled rectifier 66 is turned on to supply an input signal to the drive motor 62, the conductive element 58 corresponding to the movable contacts 50 will conductively connect the movable contacts after rotation of the cylindrical member 30 through an angle alpha. A lower power output signal from the voltage source 60 will then be established through the movable contacts 50 to the gate 86 of the second silicon controlled rectifier 84. When the gate 86 of the second silicon controlled rectifier 84 receives the output signal from the switch means 20, the second rectifier is triggered on and the capacitor 78 serves to reverse bias the rectifier 66 between the anode and cathode thereof. This reverse voltage turns the rectifier 66 off and interrupts the current input signal to the drive motor 62 from the voltage source 60. The angle alpha of FIG. 4 represents the minimum angle allowable between the fixed and movable sets of contacts 52 and 50, respectively, to allow the first silicon control rectifier 66 to be turned fully on before the gate 86 of rectifier 84 receives an output signal from the switch means 20 to turn the rectifier 66 off. Angle alpha is determined by the characteristics of the rectifier 66 and the rotational speed of the cylindrical member 30. As there are two diametrically opposed conductive elements 58 corresponding to each set of contacts 50 and 52, respectively, it will be understood that the above described turning on and turning off of the first silicon controlled rectifier 66 to establish and interrupt input signals to the drive motor 62 will take place twice for each revolution of the cylinder member 30. It will be further understood that the frequency and duration of each input signal pulse will be determined by the frequency of rotation of the cylindrical member 30 and the angular displacement between the respective sets of contact members 50 and 52 as determined by angle alpha.

FIG. 5 schematically represents the relative positions of the fixed contact members 52 and the movable contact members 50 to provide for maximum pulse duration of an input signal to the drive motor 62. The angle beta of FIG. 5 represents the minimum angle allowable between the plane of the movable brush set 50 and the plane of the fixed brush set 52. Angle beta is established to permit full turn off of the first silicon control rectifier 66 before it is turned on again through conductive connecting of the fixed contact members 52 with a conductive element 58 in the cylindrical member 30. Angle beta will also be determined by the characteristics of the rectifier 66 and the relative rotational speed of the cylindrical member 30. It will be understood that the movable contact members 50 may be positioned in any intermediate position between the minimum pulse position illustrated in FIG. 4 and the maximum pulse position illustrated in FIG. 5, and such intermediate position will provide a related frequency and duration of input signals to the drive motor 62 to thereby effect a different rotational speed thereof. Such an intermediate position is shown in dash lines in FIG. 5.

Referring now to FIG. 7, an alternative embodiment of a pulse control arrangement for use in controlling the current input pulses to the electric motor 62 and thereby controlling the movement of a material handling truck 12, as shown in FIG. 1, is schematically illustrated. The alternative pulse control arrangement of FIG. 7 utilizes a rotary switch means, indicated generally at 100, which may be mounted upon the material handling truck 12 in similar fashion to the support mounting for the rotary switch means 20 above described with respect to FIG. 1. The schematic control circuit of FIG. 7 differs from that of FIG. 6 primarily in that rather than utilizing silicon controlled rectifiers to control the current input pulses to the electric drive motor 62, the circuit of FIG. 7 modulates the frequency and duration of the current input pulses directly to the drive motor through controlling the relative brush contact positions of the rotary switch means 100 and the rotational speed of the switch commutator cylinder. A direct current voltage source 60 is utilized in the control circuit of FIG. 7 and may take the form of a bank of direct current batteries as above described for the control circuit of FIG. 6.

The rotary switch means 100 employs a rotatable commutator cylinder 102 made from a dielectric material. The commutator cylinder 102 has a pair of diametrically opposed arcuate commutator conductive elements 104 embedded in the peripheral surface thereof such that the outer peripheral surfaces of the conductive elements lie in the plane of the peripheral surface of the commutator cylinder 102. The commutator cylinder 102 may be suitably supported on the material handling truck 12 for rotational movement in any conventional manner such as through the bearings 32 and support plates 26 and 28 above described with respect to FIG. 2. A fractional horsepower variable speed electric motor 106 is coupled to the commutator cylinder 102 of the rotary switch means 100 through suitable means 108 to effect rotation thereof as will be more fully described hereinbelow.

A pair of carbon graphite brush contacts 110 and 112, similar to the above described brush contacts 50 and 52, are supported in generally radial relation to the commutator cylinder 102 and its conductive elements 104 through suitable means such as the relatively rotatable housing portions 22 and 24 of the rotary switch means 20 described above with respect to FIG. 2. The brush contact 110 is angularly movable about the peripheral surface of the cylinder 102 relative to fixed brush contact member 112 in either a clockwise or counterclockwise direction when viewing FIG. 7. The arcuate circumferential extent of the conductive elements 104 and the circumferential thickness of the brush contacts 110 and 112 are such that when the brush contacts are disposed in a common plane on diametrically opposite sides of the cylinder 102, the conductive elements cannot conductively connect the brush contacts, thereby establishing a neutral nonconductive switch position. Angular movement of the movable brush contact 110 about the peripheral surface of the commutator cylinder 102 relative to the fixed brush contact 112 will effect conductive connection between the movable and fixed brush contacts through the conductive elements 104 upon rotational movement of the commutator cylinder. It will be understood that the duration of each conductive connection will be dependent upon the extent of angular displacement of the movable brush contact 110, the maximum duration of conduction being attained when the movable and fixed brush contacts are in coplanar relation on the same side of the rotatable commutator cylinder 102. As there are two conductive elements 104, when the movable brush contact 110 is angularly displaced to a position wherein it can be conductively connected to the fixed brush contact 112 through a conductive element, such conduction will take place twice during each revolution of the commutator cylinder.

The fixed brush contact 112 is connected through a manual on-off switch 114 to the positive terminal of the direct current voltage source 60. The movable brush contact 110 is connected to the direct current electric drive motor 62 through a conductor 116 in a conventional manner. The control circuit through the electric drive motor 62 is completed to the negative terminal of the voltage source 60 through a suitable conductor 118. It can be seen that angular displacement of the movable brush contact 110 to the above described position wherein it can be conductively connected to the fixed brush contact 112 through a conductive element 104 during rotation of the commutator cylinder 102 will subject the electric drive motor 62 to current input pulses when the switch 114 is closed, the duration of each input pulse being established by the relative angular displacement of the movable brush contact 110 and the rotational speed of the commutator cylinder.

The fractional horsepower motor 106 which drives the commutator cylinder 102 is connected to the on-off switch 114 and voltage source 60 through a rheostat, indicated generally at 120, having a conventional wiper 122 suitably connected to the motor 106. The circuit through the commutator drive motor 106 is completed to the negative terminal of the voltage source 60 through a conductor 124. The rheostat 120, being connected in series with the commutator cylinder drive motor 106, may be manually adjusted through the wiper 122 to change the resistance in series with the electric motor 106, thereby increasing or decreasing the rotational speed of the commutator drive motor and thus the rotational speed of the commutator cylinder 102 of rotary switch means 100. Selective adjustment of the rheostat 120 provides selective adjustment of the frequency of conductive connection between the conductive elements 104 of the rotary switch means and the fixed and movable brush contacts 112 and 110, respectively, and thereby provides frequency modulation of the current pulses to the electric drive motor 62.

Preferably, a diode 126 is connected across the electric drive motor 62 in a manner to provide arc suppression for the drive motor, clipping any inductive kick in the drive motor when the circuit from the voltage source 60 to the drive motor 62 is opened.

While preferred embodiments of our invention have been shown and described, it will be understood that changes and modifications may be made therein without departing from the invention in its broader aspects, and therefore, the appended claims are intended to cover all such changes and modifications as fall within the true spirit and scope of our invention.

We claim:

1. A control arrangement for modulating electrical pulses from a direct current voltage source to an electric motor and the like, comprising circuit means adapted to selectively electrically connect the voltage source to the electric motor, said circuit means including driven rotary switch means having brush contacts adjustable to establish first and second output pulse signals in selective time relation to each other to effect connection of the voltage source to the motor, said circuit means including means to receive said first and second output pulse signals, said last mentioned means serving to close said circuit means and connect the voltage source to the electric motor upon receipt of said first pulse signal, and serving to open said circuit means to prevent connection of the voltage source to the electric motor upon receipt of said second pulse signal.

2. A control arrangement as defined in claim 1 wherein said rotary switch includes a rotatably driven commutator member having conductive elements thereon and first and second sets of brush contacts operatively associated with said rotatable commutator member, said conductive elements being adapted to conductively connect said first set of brush contacts to establish said first output signal during rotation of said commutator member, and being adapted to conductively connect said second set of brush contacts to establish said second output signal during rotation of said commutator member.

3. A control arrangement as defined in claim 2 wherein one set of said first and second sets of contact members is rotatably movable about the peripheral surface about said cylinder relative to the other set of contact members so as to vary the conductive phase relationship between said first and second sets of contact members.

4. A control arrangement as defined in claim 1 wherein said means to receive said first and second output pulse signals includes silicon controlled rectifier means.

5. A control arrangement as defined in claim 1 wherein said means to receive said first and second output pulse signals comprises first and second silicon controlled rectifiers, said first silicon controlled rectifier being adapted to receive said first pulse signal and conductively connect the voltage source to the motor, said second silicon controlled rectifier being adapted to receive said second pulse signal and turn off said first silicon controlled rectifier upon receipt of said second output signal.

6. A control arrangement for modulating electrical pulses from a direct current voltage source to an electric motor and the like, comprising circuit means adapted to selectively connect the voltage source to the electric motor, said circuit means including driven rotary switch means comprising a rotatably driven commutator member and brush contacts supported to engage the peripheral surface of said commutator during rotation thereof, said commutator member having four conductive elements disposed thereon to provide two sets of axially spaced conductive elements with the elements of each set being diametrically opposed about the peripheral surface of said commutator, said conductive elements being adapted to electrically connect said brush contacts during rotation of said commutator member to establish pulse signals operative to effect connection of the voltage source to the motor, said brush contacts being adjustable about said commutator member to establish pulse signals of selectively variable duration through said switch means to the motor.

7. A control arrangement as defined in claim 6 wherein each conductive element has a circumferential width substantially identical to the circumferential widths of the contact surfaces of said contact members.

8. A control arrangement for modulating electrical pulses from a direct current voltage source to an electric motor and the like, comprising circuit means adapted to selectively electrically connect the voltage source to the electric motor, said circuit means including driven rotary switch means comprising a rotatably driven commutator having conductive elements thereon and brush contacts adjustable to establish pulse signals operative to effect connection of the voltage source to the motor, said conductive elements being adapted to electrically connect said brush contacts during rotation of said commutator member, and said brush contacts comprising at least two sets of contacts, one of said sets of contacts being movable relative to the other set of contacts to allow changing of the conductive phase relationship between said sets of brush contacts.

9. A control circuit for controlling current pulses from a voltage source to the drive motor of a material handling apparatus for effecting movement thereof, comprising circuit means including manually adjustable switch means comprising a rotary switch having first and second sets of brush contacts, said rotary switch being adapted to establish first and second output signals of varying frequency and pulse duration, said circuit means further including means to receive said output signals and conductively connect the voltage source to the drive motor upon receipt of said first output pulse signals and prevent conductive connection of the voltage source to the drive motor upon receipt of said second output pulse signals.

10. A control circuit as defined in claim 9 wherein said first set of brush contacts is movable relative to said second set to provide variable conductive phase relationship between the brush contacts of the respective first and second sets of brush contacts.

11. A control circuit as defined in claim 9 wherein said means to receive said output pulse signals comprises silicon controlled rectifier means.

12. A control circuit as defined in claim 9 wherein said means to receive said output pulse signals comprises first and second silicon controlled rectifiers, said first silicon controlled rectifier being adapted to receive said first output pulse signals and connect the voltage source to the drive motor upon receipt thereof, said second silicon controlled rectifier being adapted to turn off said first silicon controlled rectifier upon receipt of said second output pulse signals to prevent conductive connection between the voltage source and the drive motor.

References Cited
UNITED STATES PATENTS

| | | | |
|---|---|---|---|
| 1,781,762 | 11/1930 | Murphy | 318—346 X |
| 2,862,166 | 11/1958 | Schmid | 318—330 X |
| 3,374,412 | 3/1968 | Payne | 318—341 |
| 3,419,778 | 12/1968 | Gurwicz | 318—341 |

ORIS L. RADER, Primary Examiner

W. E. DUNCANSON, Jr., Assistant Examiner

U.S. Cl. X.R.
318—341